Dec. 28, 1948.   K. R. WARE   2,457,511
POWER OPERATED TRACTOR MOUNTED TREE FELLING SAW
Filed Oct. 18, 1946   2 Sheets-Sheet 1
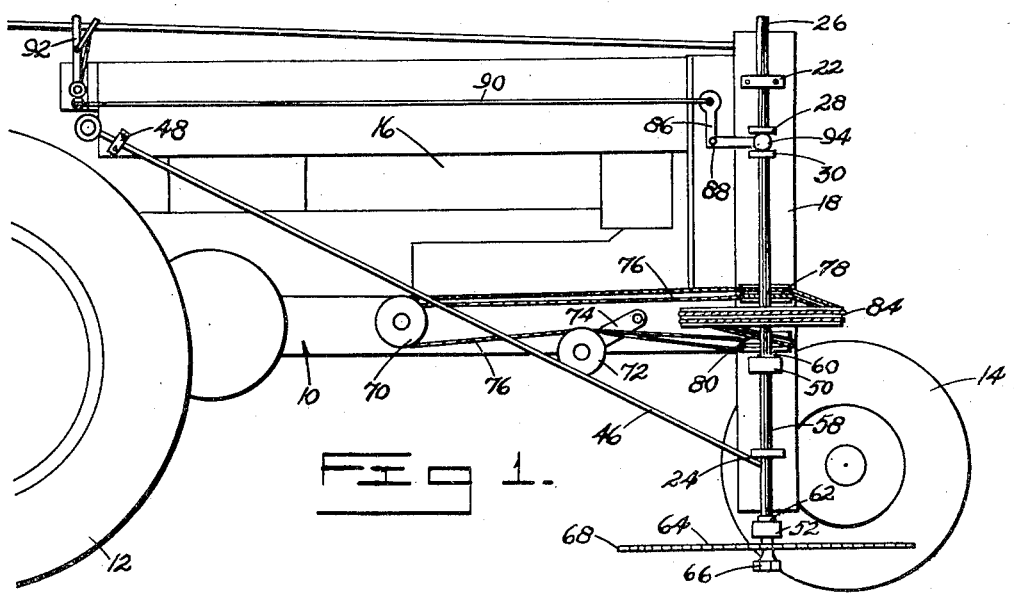
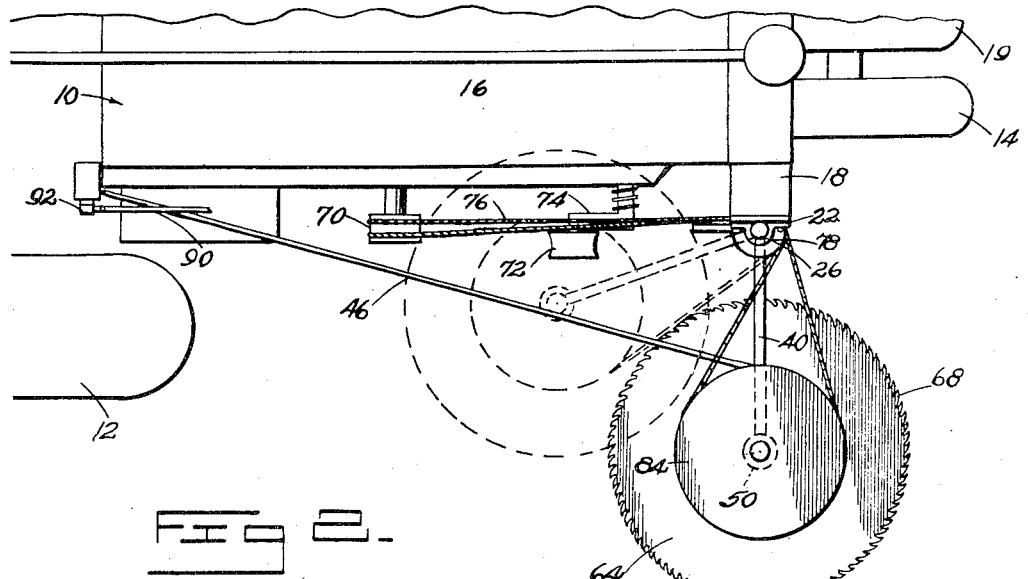
Inventor
KENNETH R. WARE

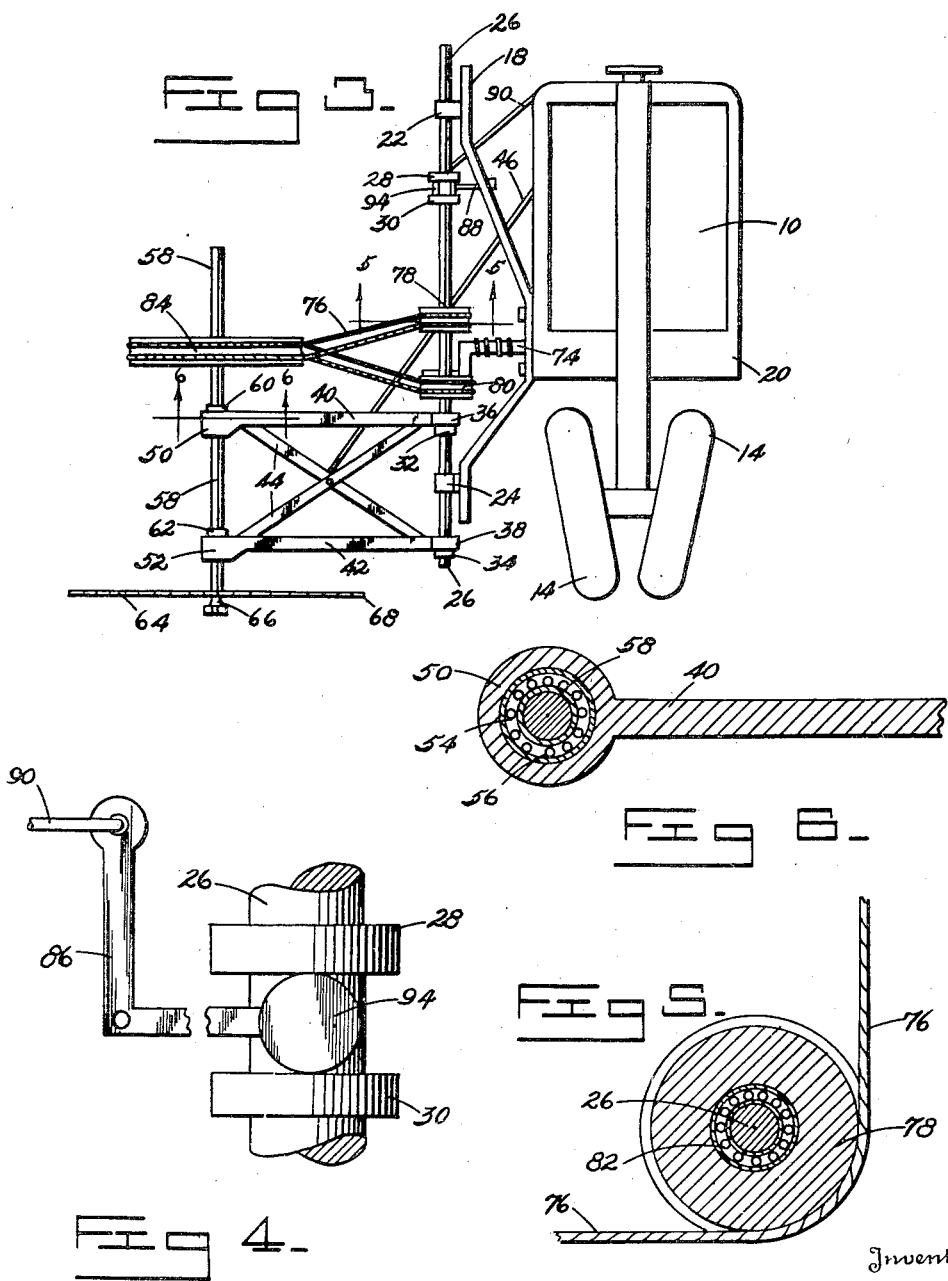

Patented Dec. 28, 1948

2,457,511

UNITED STATES PATENT OFFICE 2,457,511

POWER OPERATED TRACTOR MOUNTED TREE FELLING SAW

Kenneth R. Ware, Mound Valley, Kans.

Application October 18, 1946, Serial No. 704,119

6 Claims. (Cl. 143—43)

The present invention relates generally to a power operated saw.

More particularly the invention is concerned with an improved power operated saw adapted to be mounted on and driven by a tractor or the like for cutting down trees and clearing brush.

In the past circular saws have been provided on tractors or the like which could be readily moved into operating position for cutting down trees or clearing brush in the manner contemplated by the present invention, but such known prior art devices have been generally unsatisfactory due largely to their extremely complicated, cumbersome, and expensive construction.

It is accordingly an important object of the present invention to provide a power operated saw adapted to be mounted on and driven by a tractor or the like which may be expeditiously and relatively inexpensively manufactured and which may be incorporated into tractors of standard design with but slight modification of the latter.

Another object of the invention is to provide a power driven saw of the type described which is extremely rugged in construction and well adapted to withstand the hard usage to which such devices are customarily subjected during the course of normal usage.

A further object of the invention resides in the provision of a power operated saw adapted to be mounted on a tractor or the like which is adjustable from the driver's seat to different vertical positions above the ground to accommodate rough or uneven terrain and to leave stumps of any desired height after felling trees.

Yet another object of the invention is to provide an improved mechanism for effecting vertical adjustments of a tractor carried saw which is mounted on a swinging arm wherein a bell crank is mounted on the arm supporting bracket and has one end operatively associated with the arm for raising or lowering the latter and its other end connected to a control rod operable from the driver's seat of the tractor.

The above as well as other and further objects and advantages of the invention together with a more complete understanding of the precise nature thereof will become more readily apparent to one skilled in the art from a consideration of the following detailed specification taken in conjunction with the accompanying drawings wherein:

Fig. 1 is a side elevational view of a tractor having an improved adjustable saw in accordance with the present invention mounted thereon;

Fig. 2 is a partial top plan view of the tractor and saw of Fig. 1 showing the saw blade in one of its alternate positions in dotted lines.

Fig. 3 is a front elevational view of the tractor and saw illustrated in Fig. 1;

Fig. 4 is a detail elevational view to an enlarged scale of a portion of the saw adjusting mechanism constituting an important part of the invention;

Fig. 5 is a transverse cross-sectional view through one of the idler pulleys of the driving mechanism taken substantially along the line 5—5 of Fig. 3; and Fig. 6 is a transverse cross-sectional view through one of the bearings and a portion of the supporting arm taken substantially along the line 6—6 of Fig. 3.

Referring now in more detail to the drawings and particularly Figs. 1, 2, and 3 thereof, the invention is illustrated in a preferred form as being mounted upon a tractor of conventional design designated generally by reference numeral 10 having the usual rear wheel 12 and front wheel 14 and including a suitable power source such as the engine designated generally by the reference numeral 16. A main supporting bracket 18 is secured in any suitable manner to a fixed portion of the tractor chassis such as the cross frame 20 adjacent the front end of the tractor and includes a pair of vertically spaced upper and lower guides 22 and 24, respectively. A cylindrical pivot shaft 26 is received in the upper and lower guides 22 and 24 and is freely rotatable and axially slidable therein. The pivot shaft 26 is provided at its upper portion with a pair of spaced collars 28 and 30 which are adapted to be employed in connection with the adjusting mechanism in a manner to be hereinafter more fully described.

The pivot shaft 26 is provided at its lower end with a pair of spaced collars 32 and 34 firmly secured thereto and serving to support for free swinging movement thereon the inner bearings 36 and 38 of a swinging arm comprising upper and lower horizontal frames 40 and 42, respectively, and a pair of cross braces 44. The frames 40—42 and cross braces 44 constitute a horizontally extending trussed arm which is free to pivot about the pivot shaft 26 under the control of a control rod 46 which is secured to the cross braces 44 and extends through a guide 48 to a position adjacent the driver's seat of the tractor. Vertically spaced bearings 50 and 52 are provided at the outer extremities of the upper and lower frames 40 and 42, respectively, and as illustrated most clearly in Fig. 6 each bearing 50—52 is provided with anti-friction means preferably in the form of a plurality of balls or rollers 54 retained in a suitable race 56. A drive shaft 58 is rotatably mounted within the bearings 50—52 and is prevented from axial translational movement therein by any suitable means such as the spaced collars 60—62 which are firmly secured to the drive shaft 58 and which rest on bearings 50 and 52, respectively. A circular saw 64 is firmly attached to the bottom of the drive shaft 58 as by means of a suitable locking mechanism 66 and is provided with a plurality of cutting teeth 68 on its outer periphery for cutting down trees or the like in a manner well-known to the art.

In accordance with the present invention power for operating the saw is preferably obtained from the same engine 16 of the tractor upon which the saw is mounted and for this purpose a suitable power take off pulley 70 projects from the tractor chassis and may be selectively driven by the engine 16 through any suitable clutching mechanism (not shown). An adjusting pulley 72 is swingably mounted on an arm 74 which in turn is pivotally mounted in the tractor chassis and may be tensioned in any convenient manner to take up the slack in a double V belt 76 which extends over the adjusting pulley 72 and is adapted to be driven by the power take off pulley 70. The double V belt 76 extends over a pair of spaced idler pulleys 78 and 80 which are freely rotatable about anti-friction bearings 82 (Fig. 5) on the pivot shaft 26 and thence extends in driving relation around a driving pulley 84 which is firmly secured to the drive shaft 58. From the description thus far it will be apparent that the double V belt 76 constitutes an endless drive from the power take off pulley 70 to the drive pulley 84 which serves to rotate the saw 64 by means of the drive shaft 58.

The mechanism for adjusting the vertical position of the saw 64 comprises a bell crank 86 pivotally mounted on a projection 88 of the main supporting bracket 18 and having one of its arms connected by a control lever 90 to an adjusting handle 92 located adjacent the driver's seat of the tractor. The other arm of the bell crank 86 is provided with a clevis 94 which surrounds the pivot shaft between the spaced collars 28 and 30 previously referred to. Operation of the adjusting handle 92 through its lever 90, the bell crank 86, the clevis 94 and the collars 28 and 30 effects vertical movement of the pivot shaft 26 within the guides 22 and 24. This movement of the pivot shaft 26 by means of the spaced collars 32—34 which support the inner bearings 36—38 of the frames 42—44 operates to raise or lower the entire swinging arm carrying with it the spaced bearings 50—52, the drive shaft 58, and the saw 64 and its drive pulley 84.

In operation of the adjustable power saw according to the present invention the tractor or other machine may be driven to the desired location where trees or brush are to be cut with the saw in its raised inner position as illustrated in dotted lines in Fig. 2. When the tractor has reached the proper location the vertical position of the saw above the ground may be adjusted by operation of the control handle 92 from ground level up to a reasonable height, the power take off pulley 70 may be engaged in driven relation with the tractor engine 16, and the saw fed into the work by means of the control rod 46. Any desired vertical adjustments of the saw are effected without disturbing the driving relation of the double V belt 76 by virtue of the double idler pulleys 78—80 and adjusting pulley 72 which operate to maintain adequate driving alignment and to take up any slack in the driving system.

From the foregoing it will be clear that I have provided an improved power operated saw adapted to be mounted on and driven by a tractor which is extremely rugged and consists of relatively few parts which may be readily procured and assembled without undue expense. The saw is adaptable to various operating conditions, being equally efficient and effective in the clearing of brush or the cutting down of relatively large trees.

Obviously, numerous other modifications, alterations and deviations from the specific structures disclosed herein as a preferred embodiment of the invention solely for purposes of illustration will occur to one skilled in the art without departing from the spirit or scope of the invention as set forth in the following claims.

I claim:

1. An adjustable power operated saw adapted to be mounted on and drvien by a tractor comprising, a main supporting bracket adapted to be secured to a fixed portion of the tractor chassis and carrying a pair of vertically spaced guides adjacent the opposite ends thereof, a pivot shaft slidably and rotatably mounted in said guides and having upper and lower pairs of spaced collars and a pair of double grooved idler pulleys thereon, a trussed arm swingably mounted on said pivot shaft adjacent said lower pair of collars and including a pair of vertically spaced anti-friction bearings at its outer end, a vertical drive shaft rotatably mounted in said bearings and having a horizontal circular saw secured to its lower end and a double grooved drive pulley attached to its upper portion, a power take off pulley and adjusting pulley extending from said tractor chassis, a double V belt operatively associated with all said pulleys for rotating said saw, a control rod connected to said arm and operable from the driver's seat of said tractor for moving said saw into working position, and means for adjusting the vertical height of said saw including a bell crank pivotally mounted on said bracket having a clevis at one end engaged between said upper pair of collars and a control lever at its other end operable from the driver's seat of said tractor.

2. An adjustable power operated saw adapted to be mounted on and driven by a tractor comprising, a main supporting bracket adapted to be secured to a fixed portion of the tractor chassis and carrying a pair of vertically spaced guides adjacent the opposite ends thereof, a pivot shaft slidably and rotatably mounted in said guides and having a pair of idler pulleys thereon, an arm swingably mounted on said pivot shaft including a pair of vertically spaced anti-friction bearings at its outer end, a vertical drive shaft rotatably mounted in said bearings and having a circular saw secured to its lower end and a drive pulley attached to its upper portion, a power take off pulley and an adjusting pulley extending from said tractor chassis, a belt operatively associated with all said pulleys for rotating said saw, a control rod connected to said arm and operable from the driver's seat of said tractor for moving said saw into working position, and means for adjusting the vertical height of said saw including a bell crank pivotally mounted on said bracket having a clevis at one end operatively associated with said pivot shaft and a control lever at its other end operable from the driver's seat of said tractor.

3. An adjustable power operated saw adapted to be mounted on and driven by a tractor comprising, a main supporting bracket adapted to be secured to a fixed portion of the tractor chassis and carrying a pair of vertically spaced guides adjacent the opposite ends thereof, a pivot shaft slidably and rotatably mounted in said guides and having a pair of idler pulleys thereon, an arm swingably mounted on said pivot shaft, a vertical drive shaft rotatably mounted in said arm and having a circular saw secured to its lower end and a drive pulley attached to its upper portion, a take off pulley extending from said tractor chassis, a belt operatively associated with all said pulleys for rotating said saw, a control rod connected to said arm and operable from the driver's seat of said tractor for moving said saw into working position, and means for adjusting the vertical height of said saw including a bell crank pivotally mounted on said bracket having a clevis at one end operatively associated with said pivot shaft and a control lever at its other end operable from the driver's seat of said tractor.

4. An adjustable power operated saw adapted to be mounted on and driven by a tractor comprising, a main supporting bracket adapted to be secured to a fixed portion of the tractor chassis and carrying a pair of vertically spaced guides adjacent the opposite ends thereof, a pivot shaft slidably and rotatably mounted in said guides, an arm swingably mounted on said pivot shaft, a vertical drive shaft rotatably mounted in said arm and having a circular saw secured to its lower end, a power take off extending from said tractor chassis, means operatively associated with said power take off and said drive shaft for rotating said saw, a control rod connected to said arm and operable from the driver's seat of said tractor for moving said saw into working position, and means for adjusting the vertical height of said saw including a bell crank pivotally mounted on said bracket having a clevis at one end operatively associated with said pivot shaft and a control lever at its other end operable from the driver's seat of said tractor.

5. An adjustable power operated saw adapted to be mounted on a tractor comprising, a main supporting bracket adapted to be secured to a fixed portion of the tractor chassis and carrying a pair of vertically spaced guides adjacent the opposite ends thereof, a pivot shaft slidably and rotatably mounted in said guides, an arm swingably mounted on said pivot shaft, a vertical drive shaft rotatably mounted in said arm and having a circular saw at its lower end, means operatively associated with said drive shaft for rotating said saw, a control rod connected to said arm and operable from the driver's seat of said tractor for moving said saw into working position, and means for adjusting the vertical height of said saw including a bell crank pivotally mounted on said bracket having a clevis at one end operatively associated with said pivot shaft and a control lever at its other end operable from the driver's seat of said tractor.

6. An adjustable power operated saw adapted to be mounted on a tractor comprising, a main supporting bracket adapted to be secured to a fixed portion of the tractor chassis and carrying a pair of vertically spaced guides adjacent the opposite ends thereof, a pivot shaft slidably and rotatably mounted in said guides, an arm swingably mounted on said pivot shaft, a vertical drive shaft rotatably mounted in said arm and having a circular saw at its lower end, means operatively associated with said drive shaft for rotating said saw, and means for adjusting the vertical height of said saw including a bell crank pivotally mounted on said bracket having a clevis at one end operatively associated with said pivot shaft and a control lever at its other end operable from the driver's seat of said tractor.

KENNETH R. WARE.

REFERENCES CITED

The following references are of record in the file of this patent:

UNITED STATES PATENTS

| Number | Name | Date |
| --- | --- | --- |
| 827,548 | Martin | July 31, 1906 |
| 1,089,341 | Jack | Mar. 3, 1914 |
| 1,182,976 | Conner et al. | May 16, 1916 |
| 1,663,759 | Ham | Mar. 27, 1928 |
| 2,216,971 | Farmer | Oct. 8, 1940 |
| 2,411,623 | Jaques | Nov. 26, 1946 |